(12) United States Patent
Baek et al.

(10) Patent No.: US 12,460,695 B2
(45) Date of Patent: Nov. 4, 2025

(54) SHOCK ABSORBER

(71) Applicant: HL MANDO CORPORATION, Gyeonggi-do (KR)

(72) Inventors: Kwangduk Baek, Gyeonggi-do (KR); Seungjoon Lee, Seoul (KR); Jongin Choi, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 426 days.

(21) Appl. No.: 18/118,143

(22) Filed: Mar. 7, 2023

(65) Prior Publication Data

US 2023/0287956 A1 Sep. 14, 2023

(30) Foreign Application Priority Data

Mar. 14, 2022 (KR) .................. 10-2022-0031420

(51) Int. Cl.
*F16F 13/00* (2006.01)
*B60G 15/06* (2006.01)
*B60G 17/08* (2006.01)

(52) U.S. Cl.
CPC .......... *F16F 13/007* (2013.01); *B60G 15/061* (2013.01); *B60G 17/08* (2013.01); *B60G 2202/30* (2013.01); *B60G 2204/62* (2013.01); *B60G 2206/41* (2013.01); *B60G 2500/104* (2013.01); *B60G 2800/162* (2013.01);
(Continued)

(58) Field of Classification Search
CPC .. F16F 13/007; F16F 222/12; F16F 2228/066; F16F 2232/08; F16F 2234/02; B60G 15/061; B60G 17/08; B60G 2202/30; B60G 2204/62; B60G 2206/41; B60G 2500/104; B60G 2800/162
USPC .............. 188/313, 314, 315, 322.15, 322.22; 267/224–226
See application file for complete search history.

(56) References Cited

U.S. PATENT DOCUMENTS 5,333,708 A * 8/1994 Jensen ....................... F16F 9/49
188/284
10,962,081 B2 * 3/2021 Sankaran ............... B60G 13/08
(Continued)

FOREIGN PATENT DOCUMENTS

KR 10-1947064 2/2019
KR 20200142839 A * 12/2020 ............ F16F 9/3405

*Primary Examiner* — Christopher P Schwartz
(74) *Attorney, Agent, or Firm* — WOMBLE BOND DICKINSON (US) LLP

(57) ABSTRACT

An embodiment of the present disclosure provides a shock absorber including a piston valve configured to be in a tube, a body valve installed at a lower side of the tube, a piston rod configured to having one end protruding while penetrating the piston valve, an upper guide member interposed between the piston valve and the body valve and having a plurality of upper guide flow paths formed outside a periphery of the upper guide member, and a plurality of upper guide holes formed inside the periphery of the upper guide member, and a hollow cylindrical expansion member having expansion through-holes through which the fluid having passed through the plurality of upper guide flow paths and the plurality of upper guide holes passes, the hollow cylindrical expansion member being configured to block the upper guide flow paths when the hollow cylindrical expansion member adjoins the upper guide member.

24 Claims, 7 Drawing Sheets

(52) U.S. Cl.
CPC ..... *F16F 2222/12* (2013.01); *F16F 2228/066* (2013.01); *F16F 2232/08* (2013.01); *F16F 2234/02* (2013.01)

(56) References Cited

U.S. PATENT DOCUMENTS

| | | | |
|---|---|---|---|
| 11,796,024 B2 * | 10/2023 | Baek | F16F 9/49 |
| 12,234,881 B2 * | 2/2025 | Cho | F16F 9/5126 |
| 12,259,019 B2 * | 3/2025 | Lee | F16F 9/516 |
| 2018/0355944 A1 * | 12/2018 | Veltum | F16F 9/185 |

* cited by examiner

SHOCK ABSORBER

CROSS-REFERENCE TO RELATED APPLICATIONS

This application claims benefit and priority to Korean Patent Application No. 10-2022-0031420, filed on Mar. 14, 2022, with the Korean Intellectual Property Office, the disclosure of which is incorporated herein in its entirety by reference.

TECHNICAL FIELD

The present disclosure relates to a shock absorber, and more particularly, to a shock absorber used for a suspension system for a vehicle.

BACKGROUND

In general, a shock absorber is called a damper and refers to a device installed in a vehicle to absorb and attenuate impact or vibration applied to an axle from a road surface while the vehicle travels.

The shock absorber includes a cylinder filled with oil, a piston rod connected to a vehicle body side and configured to reciprocate, a piston valve connected to a lower end of the piston rod and configured to slide in the cylinder and control a flow of a fluid, and a body valve installed at a lower end of the cylinder and configured to face the piston valve.

An interior of the cylinder is divided into a compression chamber and an extension chamber by the piston valve, and a compression flow path and an extension flow path are penetratively formed in a vertical direction in the piston valve. Therefore, the piston valve generates a damping force by using a resistive force of a fluid while reciprocating in directions of compression and extension processes. In addition, the fluid generates a damping force while passing through the body valve during the compression and extension processes of the piston valve.

Therefore, the shock absorber may increase durability life by reducing dynamic stress of respective components of a vehicle body, ensure grounding properties of a tire by inhibiting a motion of the mass, and improve motional performance of a vehicle by inhibiting a change in posture caused by an inertial force.

Meanwhile, when the damping force of the shock absorber is set to be low, the shock absorber may absorb vibration caused by unevenness of a road surface, thereby improving ride quality. On the contrary, when the damping force of the shock absorber is set to be high, a change in posture of the vehicle body may be inhibited, thereby improving driving stability. Therefore, there has been developed and used a shock absorber equipped with a variable damping force valve capable of varying damping force characteristics of the shock absorber according to the intended use of a vehicle.

However, when the shock absorber generates the damping force only by using a pressure of the fluid, a size of the shock absorber needs to be increased to increase the damping force even though the damping force of the shock absorber varies. Therefore, there is a continual effort to increase the damping force while keeping the shock absorber compact.

DOCUMENT OF RELATED ART

Patent Document (Patent Document 1) Korean Patent No. 10-1947064

SUMMARY

The present disclosure has been made in an effort to provide a shock absorber capable of increasing a damping force while having a simple configuration.

An embodiment of the present disclosure provides a shock absorber including: a tube having an interior filled with a fluid; a piston valve configured to be movable upward or downward in the tube and having a flow path through which the fluid flows; a body valve installed at a lower side of the tube and having a flow path through which the fluid flows; a piston rod configured to support the piston valve and having one end protruding while penetrating the piston valve; an upper guide member interposed between the piston valve and the body valve and having a plurality of upper guide flow paths formed outside a periphery of the upper guide member, and a plurality of upper guide holes formed inside the periphery of the upper guide member; a hollow cylindrical expansion member coupled to one end of the piston rod and having expansion through-holes through which the fluid having passed through the plurality of upper guide flow paths and the plurality of upper guide holes passes, the hollow cylindrical expansion member being configured to block the upper guide flow paths when the hollow cylindrical expansion member adjoins the upper guide member; and an elastic member interposed between the upper guide member and the body valve.

The upper guide member may include: an upper guide body having the plurality of upper guide holes and having a circular plate shape that adjoins one end of the elastic member; and a plurality of upper guide protrusions protruding from a periphery of the upper guide body and configured to adjoin an inner peripheral surface of the tube, the plurality of upper guide protrusions being spaced apart from one another in a circumferential direction. Further, the upper guide flow paths may be formed between the plurality of upper guide protrusions.

The hollow cylindrical expansion member may include: an annular portion configured to be movable along an inner peripheral surface of the tube and having an expansion guide hole through which the fluid having passed through the plurality of upper guide flow paths and the plurality of upper guide holes flows, the annular portion being configured to block the plurality of upper guide flow paths when the annular portion adjoins the upper guide member; and a hollow cylindrical portion extending in a direction from the annular portion toward the piston valve and coupled to one end of the piston rod, the hollow cylindrical portion being spaced apart from the inner peripheral surface of the tube and having the expansion through-holes formed in a lateral surface of the hollow cylindrical portion that faces the inner peripheral surface of the tube.

The shock absorber may further include a piston ring provided on an outer peripheral surface of the annular portion of the hollow cylindrical expansion member and configured to adjoin the inner peripheral surface of the tube.

A ring accommodation groove may be formed in the outer peripheral surface of the annular portion, and the piston ring may be inserted into the ring accommodation groove.

The shock absorber may further include: an impact mitigation member provided on one surface of the upper guide member and having a truncated conical shape having a diameter that increases toward the upper guide member such that the truncated conical shape is inserted into the hollow cylindrical portion through the expansion guide hole of the annular portion, the impact mitigation member having therein a plurality of connection flow paths that connects the plurality of upper guide holes and the expansion through-holes.

When the piston valve moves downward during a compression process, the impact mitigation member may be inserted into the hollow cylindrical portion of the hollow cylindrical expansion member, and an area of a flow path connecting the expansion guide hole and the expansion through-holes may decrease as the hollow cylindrical expansion member and the upper guide member become close to each other.

The shock absorber may further include a connection pin configured to couple the impact mitigation member and the upper guide member while penetrating the impact mitigation member and the upper guide member.

The shock absorber may further include a damping force adjustment member provided on the other surface of the upper guide member facing the body valve, the damping force adjustment member being configured to restrict a part of a flow of the fluid flowing to the plurality of upper guide holes.

The damping force adjustment member may include: a first disc having a plurality of cut-out portions formed along a periphery of the first disc and configured to communicate with some or all of the plurality of upper guide holes; and a second disc configured to adjoin a surface of the first disc facing the body valve and cover some or all of the plurality of cut-out portions.

The shock absorber may further include a lower guide member interposed between the elastic member and the body valve and configured to support the other end of the elastic member.

When the piston valve begin to move downward during a compression process, a part of the fluid in a region in which the elastic member is disposed may pass through the plurality of upper guide flow paths and the plurality of upper guide holes of the upper guide member and then flow toward the piston valve through the expansion through-holes of the hollow cylindrical expansion member. When the piston valve moves downward, the hollow cylindrical expansion member may adjoin the upper guide member and block the plurality of upper guide flow paths, and the fluid may flow to the expansion through-holes through the plurality of upper guide holes.

Another embodiment of the present disclosure provides a shock absorber including: a first tube having an interior filled with a fluid; a piston valve configured to be movable upward or downward in the first tube and configured to divide the interior of the first tube into a compression chamber disposed at a lower side thereof and a rebound chamber disposed at an upper side thereof, the piston valve being configured to adjust a flow of the fluid between the compression chamber and the rebound chamber; a second tube configured to surround the first tube and define a reserve chamber between the first tube and the second tube; a body valve installed at a lower side of the first tube and configured to adjust a flow of the fluid between the compression chamber and the reserve chamber; a separator tube installed between the first tube and the second tube and configured to divide the reserve chamber into a high-pressure chamber and a low-pressure chamber; a damping force variable valve coupled to an outer side of the second tube and configured to communicate with the high-pressure chamber and the low-pressure chamber; a piston rod configured to support the piston valve and having one end protruding toward the compression chamber while penetrating the piston valve; an upper guide member interposed between the piston valve and the body valve and having a plurality of upper guide flow paths formed outside a periphery of the upper guide member, and a plurality of upper guide holes formed inside the periphery of the upper guide member; a hollow cylindrical expansion member coupled to one end of the piston rod and having expansion through-holes through which the fluid having passed through the plurality of upper guide flow paths and the plurality of upper guide holes passes, the hollow cylindrical expansion member being configured to block the upper guide flow paths when the hollow cylindrical expansion member adjoins the upper guide member; and an elastic member interposed between the upper guide member and the body valve.

The upper guide member may include: an upper guide body having the plurality of upper guide holes and having a circular plate shape that adjoins one end of the elastic member; and a plurality of upper guide protrusions protruding from a periphery of the upper guide body and configured to adjoin an inner peripheral surface of the tube, the plurality of upper guide protrusions being spaced apart from one another in a circumferential direction. Further, the upper guide flow paths may be formed between the plurality of upper guide protrusions.

The hollow cylindrical expansion member may include: an annular portion configured to be movable along an inner peripheral surface of the tube and having an expansion guide hole through which the fluid having passed through the plurality of upper guide flow paths and the plurality of upper guide holes flows, the annular portion being configured to block the plurality of upper guide flow paths when the annular portion adjoins the upper guide member; and a hollow cylindrical portion extending in a direction from the annular portion toward the piston valve and coupled to one end of the piston rod, the hollow cylindrical portion being spaced apart from the inner peripheral surface of the tube and having the expansion through-holes formed in a lateral surface of the hollow cylindrical portion that faces the inner peripheral surface of the tube.

The shock absorber may further include a piston ring provided on an outer peripheral surface of the annular portion of the hollow cylindrical expansion member and configured to adjoin the inner peripheral surface of the tube.

A ring accommodation groove may be formed in the outer peripheral surface of the annular portion, and the piston ring may be inserted into the ring accommodation groove.

The shock absorber may further include: an impact mitigation member provided on one surface of the upper guide member and having a truncated conical shape having a diameter that increases toward the upper guide member such that the truncated conical shape is inserted into the hollow cylindrical portion through the expansion guide hole of the annular portion, the impact mitigation member having therein a plurality of connection flow paths that connects the plurality of upper guide holes and the expansion through-holes.

When the piston valve moves downward during a compression process, the impact mitigation member may be inserted into the hollow cylindrical portion of the hollow cylindrical expansion member, and an area of a flow path connecting the expansion guide hole and the expansion through-holes may decrease as the hollow cylindrical expansion member and the upper guide member become close to each other.

The shock absorber may further include a connection pin configured to couple the impact mitigation member and the upper guide member while penetrating the impact mitigation member and the upper guide member.

The shock absorber may further include a damping force adjustment member provided on the other surface of the upper guide member facing the body valve, the damping force adjustment member being configured to restrict a part of a flow of the fluid flowing to the plurality of upper guide holes.

The damping force adjustment member may include: a first disc having a plurality of cut-out portions formed along a periphery of the first disc and configured to communicate with some or all of the plurality of upper guide holes; and a second disc configured to adjoin a surface of the first disc facing the body valve and cover some or all of the plurality of cut-out portions.

The shock absorber may further include a lower guide member interposed between the elastic member and the body valve and configured to support the other end of the elastic member.

When the piston valve begins to move downward during a compression process, a part of the fluid in a region of the compression chamber in which the elastic member is disposed may pass through the plurality of upper guide flow paths and the plurality of upper guide holes of the upper guide member and then flow to the rebound chamber through the expansion through-holes of the hollow cylindrical expansion member via the piston valve. Further, when the piston valve moves downward, the hollow cylindrical expansion member may adjoin the upper guide member and block the plurality of upper guide flow paths, and the fluid may flow to the rebound chamber through the plurality of upper guide holes.

According to the embodiment of the present disclosure, the shock absorber may increase the damping force and improve durability while having a simple configuration.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
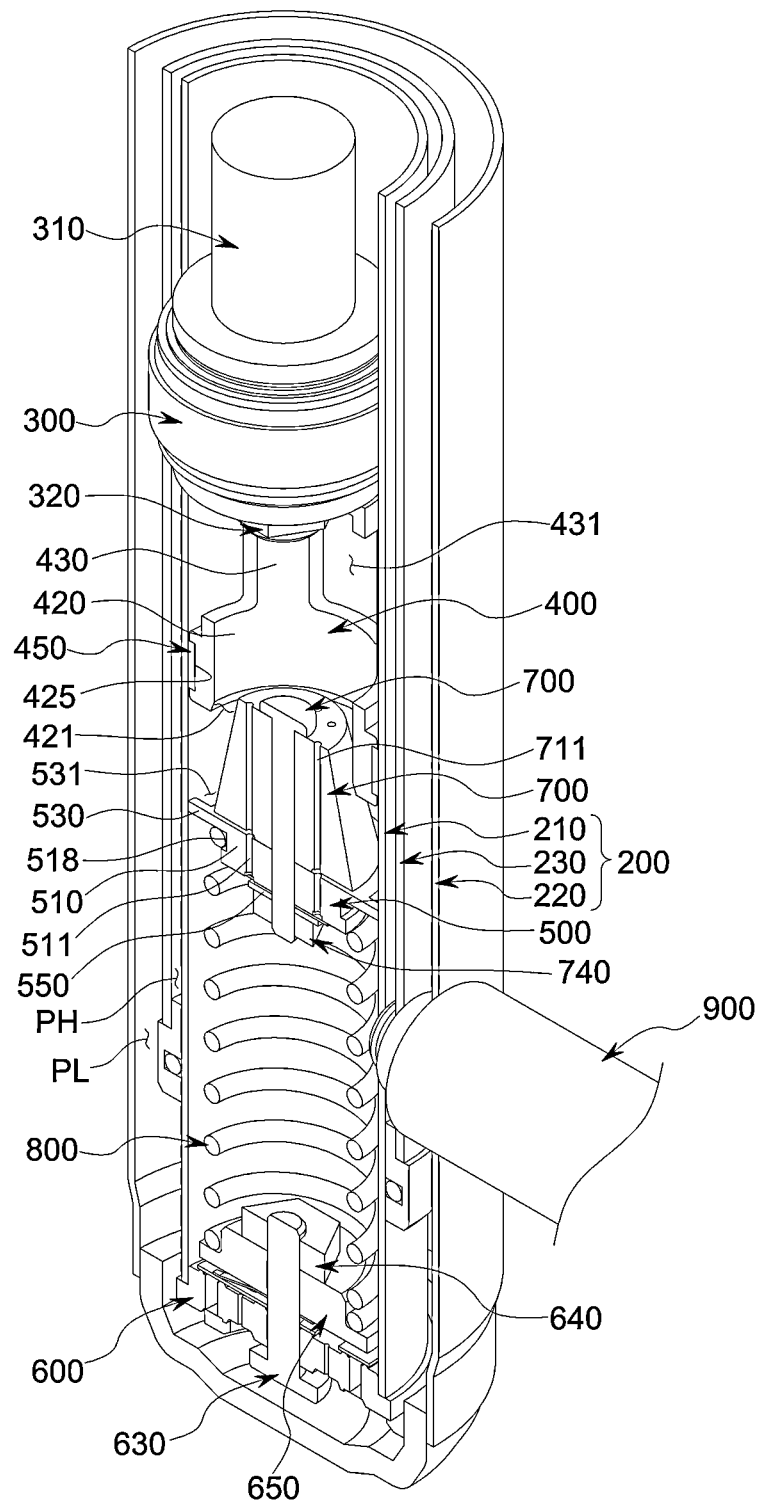
FIG. 1 is a cross-sectional perspective view illustrating a shock absorber according to an embodiment of the present disclosure.

In the following detailed description, reference is made to the accompanying drawing, which forms a part hereof. The illustrative embodiments described in the detailed description, drawing, and claims are not meant to be limiting. Other embodiments may be utilized, and other changes may be made, without departing from the spirit or scope of the subject matter presented here.

Hereinafter, embodiments of the present disclosure will be described in detail with reference to the accompanying drawings so that those with ordinary skill in the art to which the present disclosure pertains may easily carry out the embodiments. The present disclosure may be implemented in various different ways, and is not limited to the embodiments described herein.

It is noted that the drawings are schematic, and are not illustrated based on actual scales. Relative dimensions and proportions of parts illustrated in the drawings are exaggerated or reduced in size for the purpose of clarity and convenience in the drawings, and any dimension is just illustrative but not restrictive. The same reference numerals designate the same structures, elements or components illustrated in two or more drawings in order to exhibit similar characteristics.

Embodiments of the present disclosure illustrate ideal embodiments of the present disclosure in detail. As a result, various modifications of the drawings are expected. Therefore, the embodiments are not limited to specific forms in regions illustrated in the drawings, and for example, include modifications of forms by the manufacture thereof.

Unless otherwise defined, all technical and scientific terms used in the present specification have meanings generally understood by those skilled in the art to which the present disclosure pertains. All terms used in the present specification are selected for the purpose of more clearly explaining the present disclosure but not selected to restrict the scope of the present disclosure.

The expressions "include," "provided with," "have" and the like used in the present specification should be understood as open-ended terms connoting the possibility of inclusion of other embodiments unless otherwise mentioned in a phrase or sentence including the expressions.

A singular expression can include the meanings of the plurality unless otherwise mentioned, and the same applies to a singular expression stated in the claims.

The terms "first," "second," and the like used in the present specification are used to identify a plurality of constituent elements from one another and are not intended to limit the order or importance of the relevant constituent elements.

Hereinafter, a shock absorber 101 according to an embodiment of the present disclosure will be described with reference to FIGS. 1 to 6.

The shock absorber 101 according to the embodiment of the present disclosure is called a damper. For example, the shock absorber 101 may be installed in a vehicle and used to absorb and attenuate impact or vibration applied to an axle from a road surface while a vehicle travels.

Figure 2:
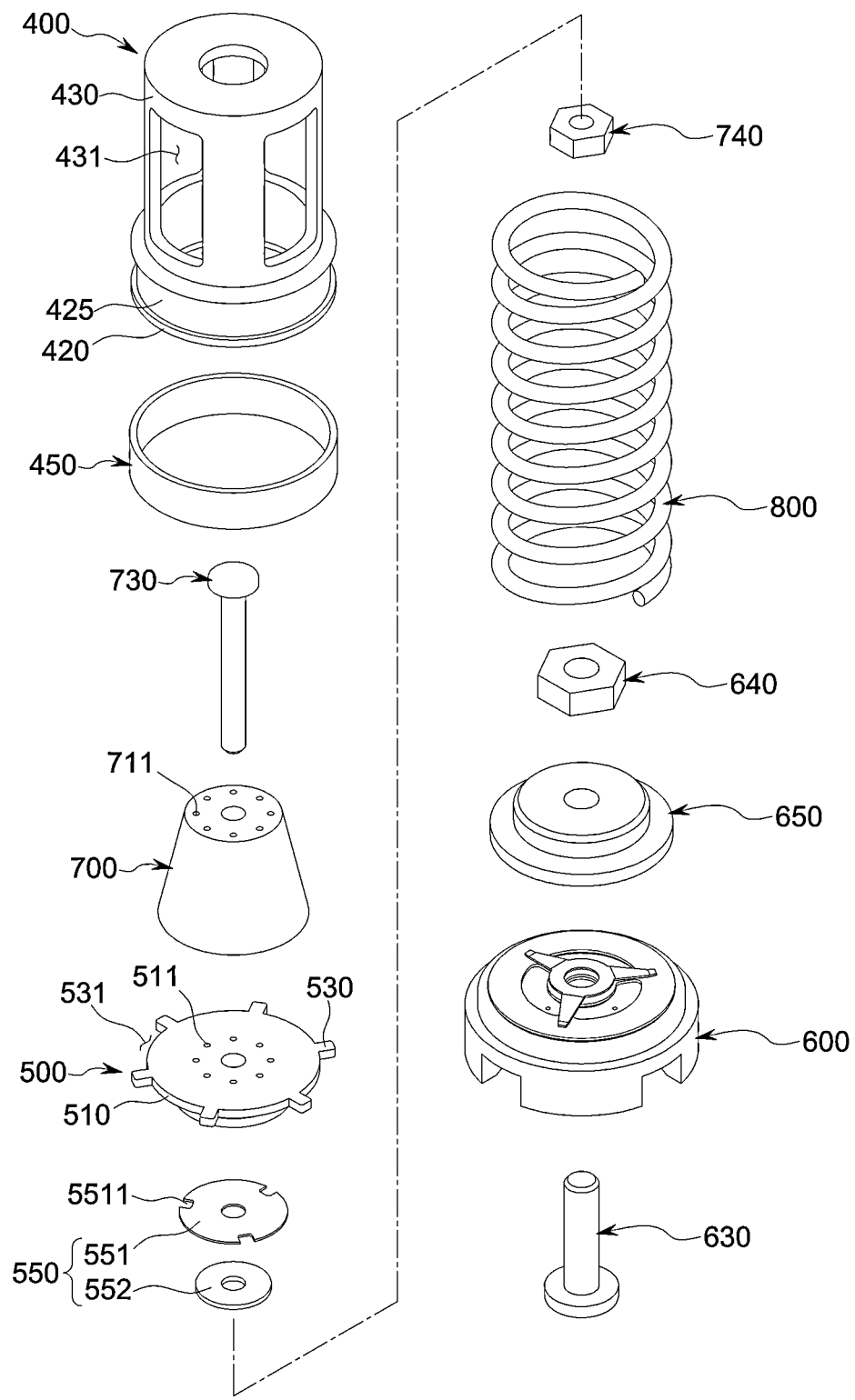
FIG. 2 is an exploded perspective view illustrating internal components of the shock absorber illustrated in FIG. 1.
Figure 3:
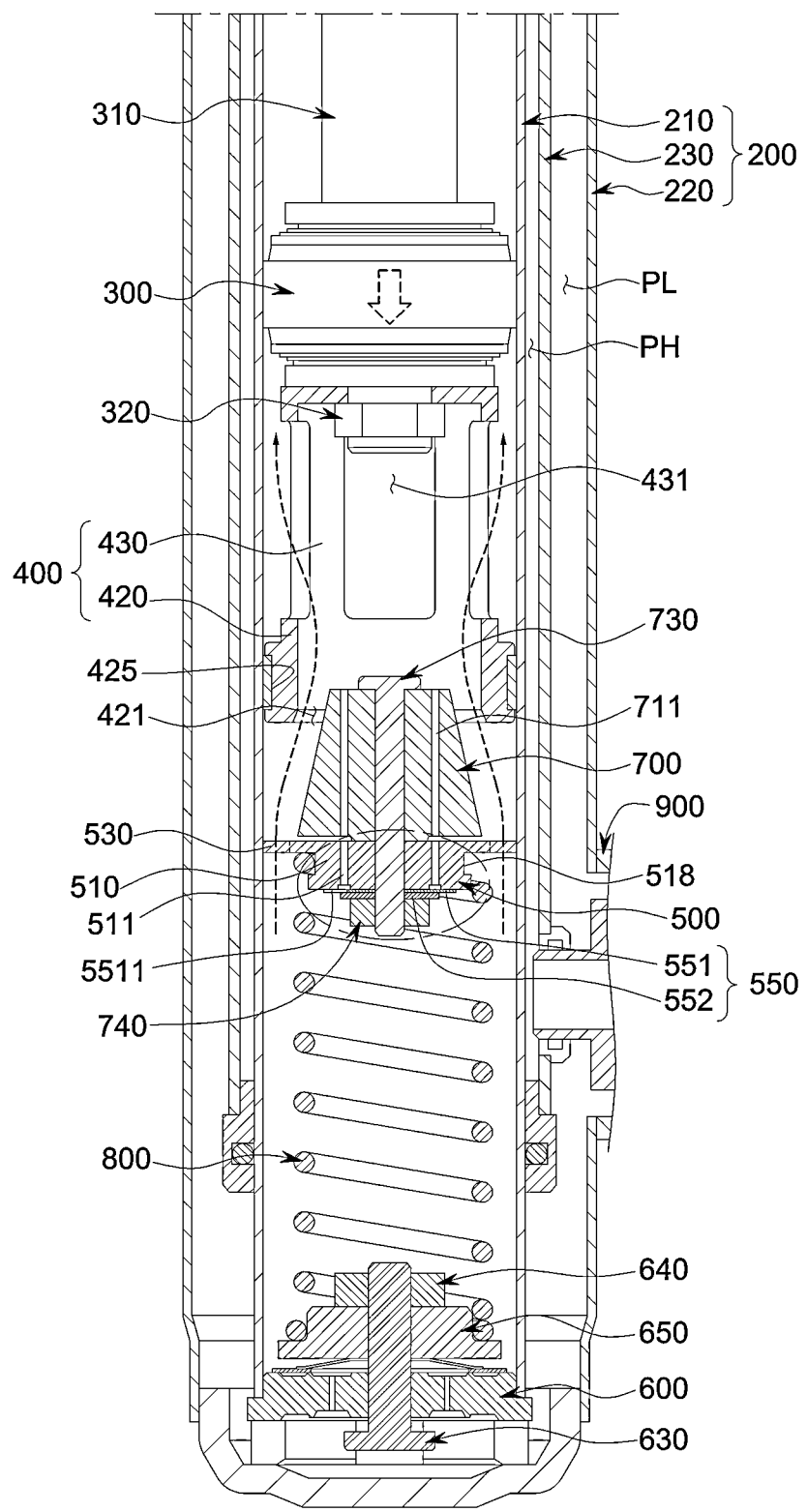
FIGS. 3 and 4 are cross-sectional views illustrating a compression process of the shock absorber illustrated in FIG. 1.

As illustrated in FIGS. 1 to 3, the shock absorber 101 according to the embodiment of the present disclosure includes a tube 200, a piston valve 300, a body valve 600, a piston rod 310, an upper guide member 500, a hollow cylindrical expansion member 400, and an elastic member 800.

The shock absorber 101 according to the embodiment of the present disclosure may further include a damping force variable valve 900, a piston ring 450, an impact mitigation member 700, a connection pin 730, a damping force adjustment member 550, and a lower guide member 650.

The shock absorber 101 may further include a piston nut 320, a body pin 630, a body nut 640, and a connection nut 740.

The interior of the tube 200 is filled with a fluid. For example, the tube 200 may include a first tube 210, a second tube 220, and a separator tube 230. The piston valve 300 to be described below is disposed in the first tube 210 and configured to be movable upward and downward. The interior of the first tube 210 may be divided into a compression chamber and a rebound chamber by the piston valve 500. Specifically, based on the piston valve 500, the rebound chamber may be disposed at an upper side of the first tube 210, and the compression chamber may be disposed at a lower side of the first tube 210. The second tube 220 surrounds the first tube 210 with a separation space interposed therebetween, such that a reserve chamber may be defined between the second tube 220 and the first tube 210. Further, the separator tube 230 may be installed between the first tube 210 and the second tube 230 and divide the reserve chamber into a high-pressure chamber PH and a low-pressure chamber PL.

For example, the high-pressure chamber PH may be connected to the rebound chamber through an inner hole (not illustrated) of the first tube 210, and the low-pressure chamber PL may be connected to the compression chamber through a flow path formed in the body valve 600.

As described above, the piston valve 300 may be provided to be movable upward and downward in the first tube 210 and divide the interior of the first tube 210 into the compression chamber disposed at the lower side thereof and the rebound chamber disposed at the upper side thereof. Further, although not illustrated, a flow path may be formed in the piston valve 300 so that the fluid may flow between the compression chamber and the rebound chamber. That is, the piston valve 300 may have the flow path through which the fluid passes, and the piston valve 300 may adjust the flow of the fluid between the compression chamber and the rebound chamber.

The piston rod 310 may support the piston valve 300. Specifically, one end of the piston rod 310 may penetrate the piston valve 300 and protrude to the compression chamber. Further, one end of the protruding piston rod 310 may be coupled to the piston valve 300 by means of the piston nut 320. That is, the piston nut 320 may prevent the piston valve 300 from separating from the piston rod 310.

The piston rod 310 may penetrate one end of the hollow cylindrical expansion member 400 to be described below and support the hollow cylindrical expansion member 400 together with the piston valve 300. That is, the piston nut 320 may be fastened to one end of the piston rod 310 that penetrates the piston valve 300 and one end of the hollow cylindrical expansion member 400.

The body valve 600 may be installed at the lower side of the first tube 210 and adjust the flow of the fluid between the compression chamber and the reserve chamber. That is, a flow path may be formed in the body valve 600 so that the fluid may flow between the compression chamber and the reserve chamber.

With this structure, a basic damping force against impact or vibration may be generated as the fluid in the compression chamber flows to the rebound chamber through the piston valve 300 and flows to the reserve chamber through the body valve 600 during a compression process.

The damping force variable valve 900 may be coupled to an outer side of the second tube 220 and communicate with the high-pressure chamber PH and the low-pressure chamber PL. Specifically, the damping force variable valve 900 is a kind of solenoid valve and controlled on the basis of an electric current signal. The damping force variable valve 900 may operate in one mode selected from a hard mode in which a spool closes an inner flow path and generates a high damping force and a soft mode in which the spool opens the inner flow path and generates a low damping force. The damping force variable valve 900 may switch to another mode, as necessary.

The upper guide member 500 may be interposed between the piston valve 300 and the body valve 600. A plurality of upper guide flow paths 531 is formed outside a periphery of the upper guide member 500, and a plurality of upper guide holes 511 is formed inside the periphery of the upper guide member 500.

Specifically, the upper guide member 500 includes an upper guide body 510 and a plurality of upper guide protrusions 530.

The upper guide body 510 may have a circular plate shape, and the plurality of upper guide holes 511 may be formed in the upper guide body 510. The plurality of upper guide holes 511 may be provided to connect the piston valve 300 and the body valve 600. Further, the upper guide body 510 may adjoin one end of the elastic member 800 and have a body support groove 518 for supporting the elastic member 800.

The plurality of upper guide protrusions 530 may protrude from the periphery of the upper guide body 510 and adjoin an inner peripheral surface of the first tube 210. That is, the upper guide member 500 may move upward or downward in the compression chamber of the first tube 210 in the state in which the protruding ends of the plurality of upper guide protrusions 530 adjoin the inner peripheral surface of the first tube 210. In addition, the plurality of upper guide protrusions 530 may be spaced apart from one another in a circumferential direction. Further, the plurality of upper guide flow paths 531 may be formed between the plurality of upper guide protrusions 530. That is, each of the plurality of upper guide flow paths 531 is a space between the plurality of upper guide protrusions 530 spaced apart from one another. The plurality of upper guide flow paths 531 may also be provided to connect the piston valve 300 and the body valve 600. FIG. 2 clearly illustrates the plurality of upper guide flow paths 531 formed between the plurality of upper guide protrusions 530.

As described above, the fluid may flow between a region in which the elastic member 800 to be described below is disposed and a region in which the hollow cylindrical expansion member 400 to be described below is disposed through the plurality of upper guide holes 511 formed inside the periphery of the upper guide body 510 and the plurality of upper guide flow paths 531 disposed outside the periphery of the upper guide body 510 and formed between the plurality of upper guide protrusions 530.

Meanwhile, a flow rate of the fluid, which may flow through the plurality of upper guide flow paths 531, may be set to be higher than a flow rate of the fluid that may flow through the plurality of upper guide holes 511. That is, an area of the plurality of upper guide flow paths 531 through which the fluid passes may be set to be relatively larger than an area of the plurality of upper guide holes 511 through which the fluid passes. Therefore, when all the upper guide flow paths 531 and the upper guide holes 511 are opened, a large amount of fluid may pass through the upper guide flow paths 531.

The hollow cylindrical expansion member 400 is connected to one end of the piston rod 310 and has expansion through-holes 431 through which the fluid having passed through the plurality of upper guide flow paths 531 and the plurality of upper guide holes 511 passes. The hollow cylindrical expansion member 400 is formed to close the upper guide flow paths 531 when the hollow cylindrical expansion member 400 adjoins the upper guide member 500.

Specifically, the hollow cylindrical expansion member 400 may include an annular portion 420 and a hollow cylindrical portion 430.

The annular portion 420 may be movable along the inner peripheral surface of the first tube 210 and have an expansion guide hole 421 into which the impact mitigation member 700 to be described below is inserted. Further, the fluid having passed through the plurality of upper guide flow paths 531 and the plurality of upper guide holes 511 may flow through the expansion guide hole 421. Further, in the embodiment of the present disclosure, when the hollow cylindrical expansion member 400 adjoins the upper guide member 500, the annular portion 420 closes the plurality of upper guide flow paths 531.

A ring accommodation groove 425 may be formed in an outer peripheral surface of the annular portion 420, and the piston ring 450 to be described below may be inserted into the ring accommodation groove 425.

The hollow cylindrical portion 430 may extend in a direction from the annular portion 420 to the piston valve 300 and be coupled to the one end of the piston rod 310. Further, a lateral surface of the hollow cylindrical portion 430 may be spaced apart from the inner peripheral surface of the first tube 210. In addition, the expansion through-holes 431 may be formed in the lateral surface of the hollow cylindrical portion 430 that faces the inner peripheral surface of the first tube 210. Therefore, the fluid introduced into the expansion guide hole 421 of the annular portion 420 may flow in a direction toward the piston valve 300 through the expansion through-holes 431 of the hollow cylindrical portion 430.

The piston ring 450 may be provided on the outer peripheral surface of the annular portion 420 of the hollow cylindrical expansion member 400 and adjoin the inner peripheral surface of the first tube 210. The piston ring 450 may perform control to allow the fluid to flow only to the expansion guide hole 421 while preventing the fluid from flowing to a gap between the outer peripheral surface of the annular portion 420 of the hollow cylindrical expansion member 400 and the inner peripheral surface of the first tube 210.

For example, the fluid, which is in the region defined by the piston ring 450 and configured such that the elastic member 800 is disposed therein, may pass through the plurality of upper guide flow paths 531 of the upper guide member 500 and then flow in the direction toward the piston valve 300 through the expansion guide hole 421 of the annular portion 420 of the hollow cylindrical expansion member 400.

As described above, the piston ring 450 may be accommodated in the ring accommodation groove 425 of the hollow cylindrical expansion member 400.

Meanwhile, in the embodiment of the present disclosure, when the hollow cylindrical expansion member 400 adjoins the upper guide member 500, the hollow cylindrical expansion member 400 closes the plurality of upper guide flow paths 531 of the upper guide member 500. In this case, the fluid may flow only through the upper guide holes 511 of the upper guide member 500.

The impact mitigation member 700 may have a truncated conical shape having a diameter that increases toward the upper guide member 500. Further, the impact mitigation member 700 may be disposed at one side of the upper guide member 500 and inserted into the hollow cylindrical portion 430 through the expansion guide hole 421 of the annular portion 420 of the hollow cylindrical expansion member 400. Further, a plurality of connection flow paths 711 may be formed in the impact mitigation member 700 and connect the plurality of upper guide holes 511 of the upper guide member 500 and the expansion through-holes 431 of the hollow cylindrical expansion member 400.

During the compression process, the hollow cylindrical expansion member 400 and the upper guide member 500 become gradually close to each other when the impact mitigation member 700 is inserted into the hollow cylindrical portion 430 of the hollow cylindrical expansion member 400 as the piston valve 300 moves downward, such that an area of the flow path connecting the expansion guide hole 421 and the expansion through-holes 431 of the hollow cylindrical expansion member 400 may be gradually decreased by the truncated conical shape of the impact mitigation member 700. Therefore, the hydraulic pressure, which is generated in the compression chamber during the process in which the piston valve 300 moves downward, gently increases. Thereafter, when the hollow cylindrical expansion member 400 blocks the upper guide flow paths 531 of the upper guide member 500 and closes the flow path connecting the expansion guide hole 421 and the expansion through-holes 431, the fluid may be movable only through the upper guide holes 511 of the upper guide member 500, such that the hydraulic pressure is maximally increased.

As described above, when the upper guide flow paths 531 are suddenly blocked by the hollow cylindrical expansion member 400 without a gradual decrease in area of the flow path during the process in which the piston valve 300 moves downward, the hydraulic pressure rapidly increases, and impact occurs. Further, the impact causes impact feeling and impact sound. That is, in the embodiment of the present disclosure, the impact mitigation member 700 mitigates and inhibits the occurrence of impact.

The damping force adjustment member 550 may be disposed on the other surface of the upper guide member 500 facing the body valve 600 and restrict a part of the flow of the fluid flowing to the plurality of upper guide holes 511.

For example, the damping force adjustment member 550 may block some of the plurality of upper guide holes 511 of the upper guide member 500. That is, the damping force adjustment member 550 may adjust an area of the plurality of upper guide holes 511 through which the fluid passes. That is, the damping force adjustment member 550 may perform a similar function to an orifice.

In the state in which the plurality of upper guide flow paths 531 of the upper guide member 500 is blocked by the hollow cylindrical expansion member 400 during the compression process, the fluid may flow only through the upper guide holes 511. In this case, the damping force adjustment member 550 restricts an area of the upper guide holes 511 through which the fluid passes. Therefore, the area of the flow paths of the upper guide holes 511 through which the fluid passes greatly decreases, such that the hydraulic pressure applied to the compression chamber increases, and the damping force greatly increases. That is, the damping force may be adjusted depending on the degree to which the damping force adjustment member 550 restricts the flow of the fluid flowing to the plurality of upper guide holes 511.

In the embodiment of the present disclosure, the damping force may be adjusted in the hard mode and the soft mode discriminated by the damping force variable valve 900. However, basically, in consideration of an operational condition of the shock absorber 101, a damping force required to be provided by the shock absorber 101, response sensitivity, and the like, an elastic modulus of the elastic member 800 to be described below may be selectively determined at the time of designing the shock absorber 101, and a hydraulic pressure to be generated by the damping force adjustment member 550 may be determined, such that the damping force of the shock absorber 101 may be adjusted.

Figure 5:
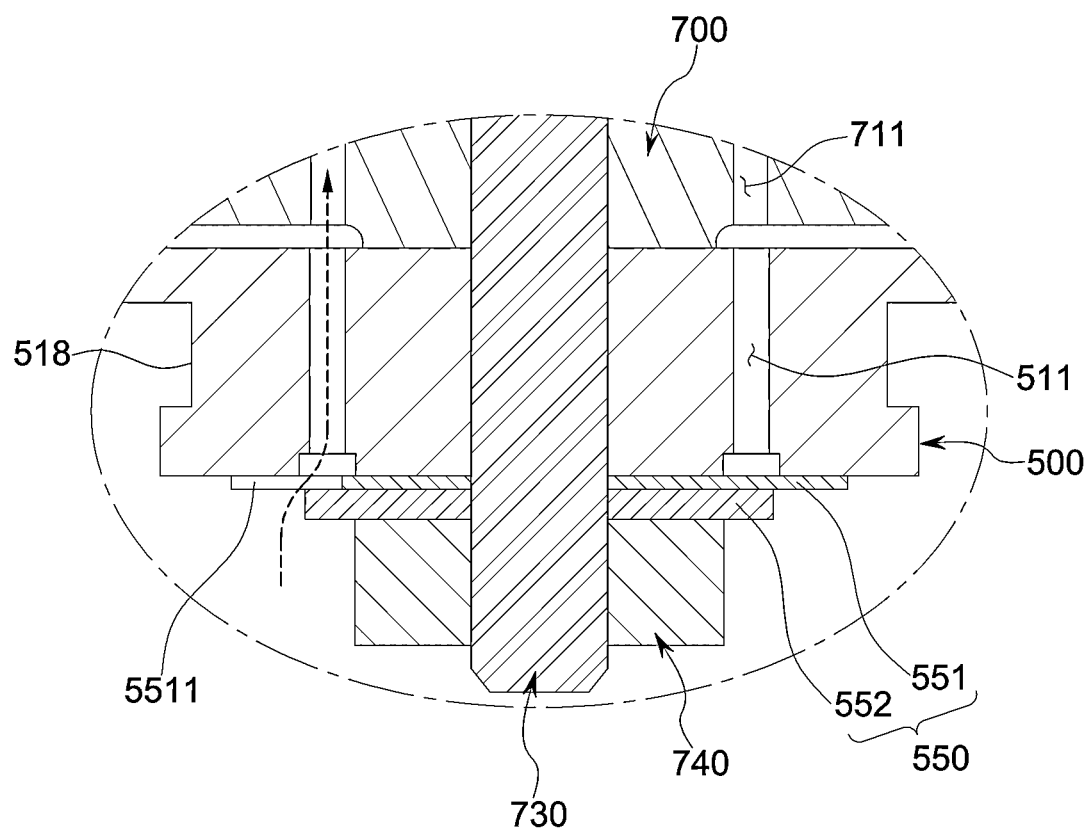
FIG. 5 is an enlarged cross-sectional view illustrating a damping force adjustment member illustrated in FIG. 4.

Specifically, as illustrated in FIG. 5, the damping force adjustment member 550 may include a first disc 551 having a plurality of cut-out portions 5511 formed along a periphery of the first disc 551 and configured to communicate with some or all of the plurality of upper guide holes 511, and a second disc 552 configured to adjoin a surface of the first disc 551 facing the body valve 600 and cover some or all of the plurality of cut-out portions 511. FIG. 2 clearly illustrates specific shapes of the plurality of cut-out portions 5511.

The connection pin 730 may couple the impact mitigation member 700, the upper guide member 500, and the damping force adjustment member 550 while penetrating the impact mitigation member 700, the upper guide member 500, and the damping force adjustment member 550.

The connection nut 740 may be fastened to one end of the connection pin 730 that penetrates the impact mitigation member 700, the upper guide member 500, and the damping force adjustment member 550.

The elastic member 800 may be interposed between the upper guide member 500 and the body valve 600. In this case, the elastic member 800 may be a coil spring.

As described above, in the shock absorber 101 according to the embodiment of the present disclosure, the elastic member 800 is disposed in the compression chamber of the first tube 210. Therefore, it is possible to use not only the damping force made by the fluid in the compression chamber but also the damping force made by the elastic member 800 during the compression process.

The lower guide member 650 may be interposed between the elastic member 800 and the body valve 600 and support the other end of the elastic member 800. That is, the upper guide member 500 and the lower guide member 650 may respectively support two opposite ends of the elastic member 800 and prevent the elastic member 800 from separating from an exact position during the process of repeatedly compressing and extending the elastic member 800.

The body pin 630 penetrates the body valve 600 and the lower guide member 650, and the body nut 640 may be fastened to one end of the body pin 630 that penetrates the body valve 600 and the lower guide member 650.

However, the embodiment of the present disclosure is not limited thereto, the body pin 630 may be a rivet, and the body pin 630 may be fastened to the body valve 600 and the lower guide member 650 riveting. In this case, the body nut 640 may be eliminated.

Figure 4:
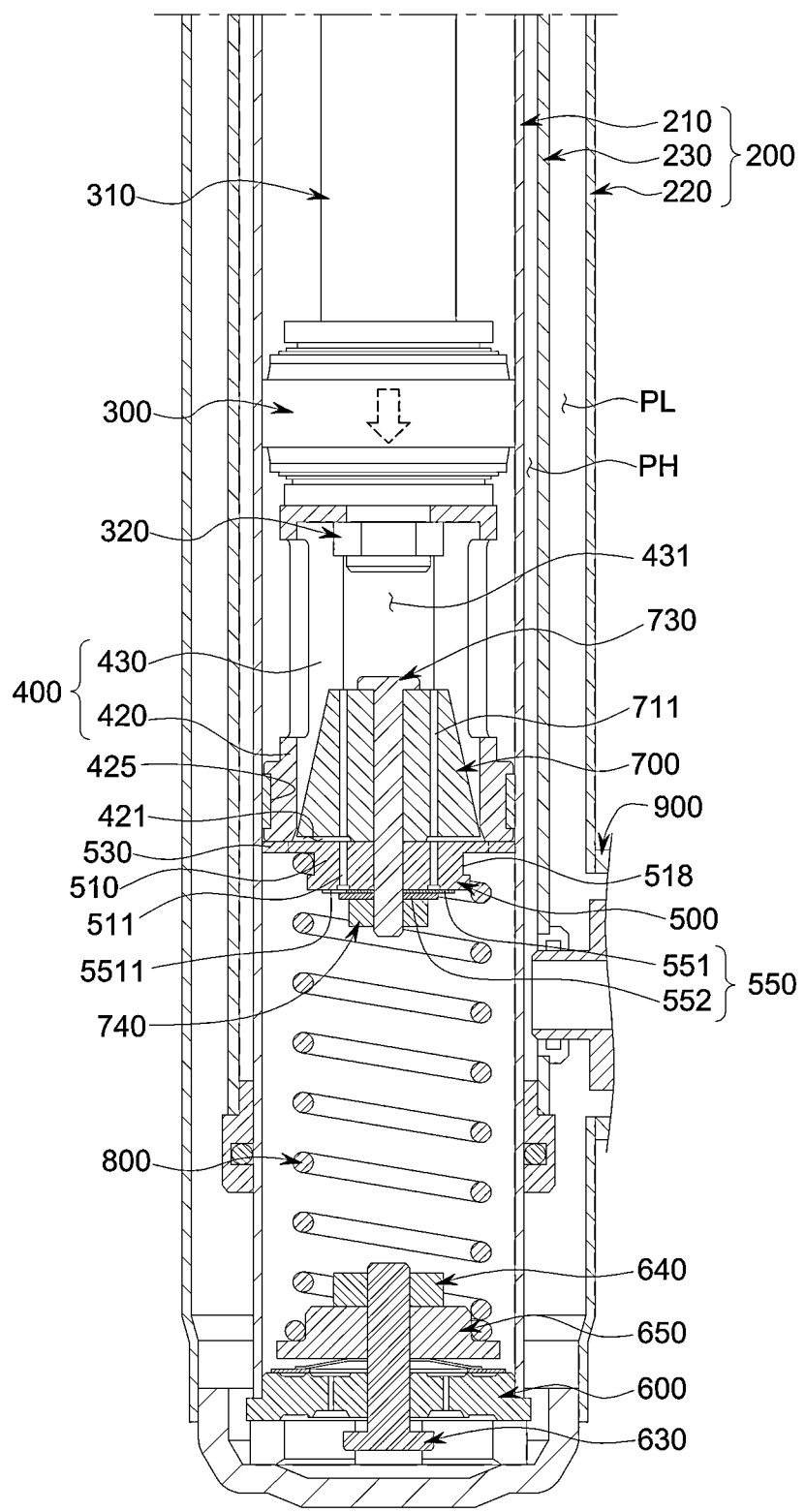
Figure 6:
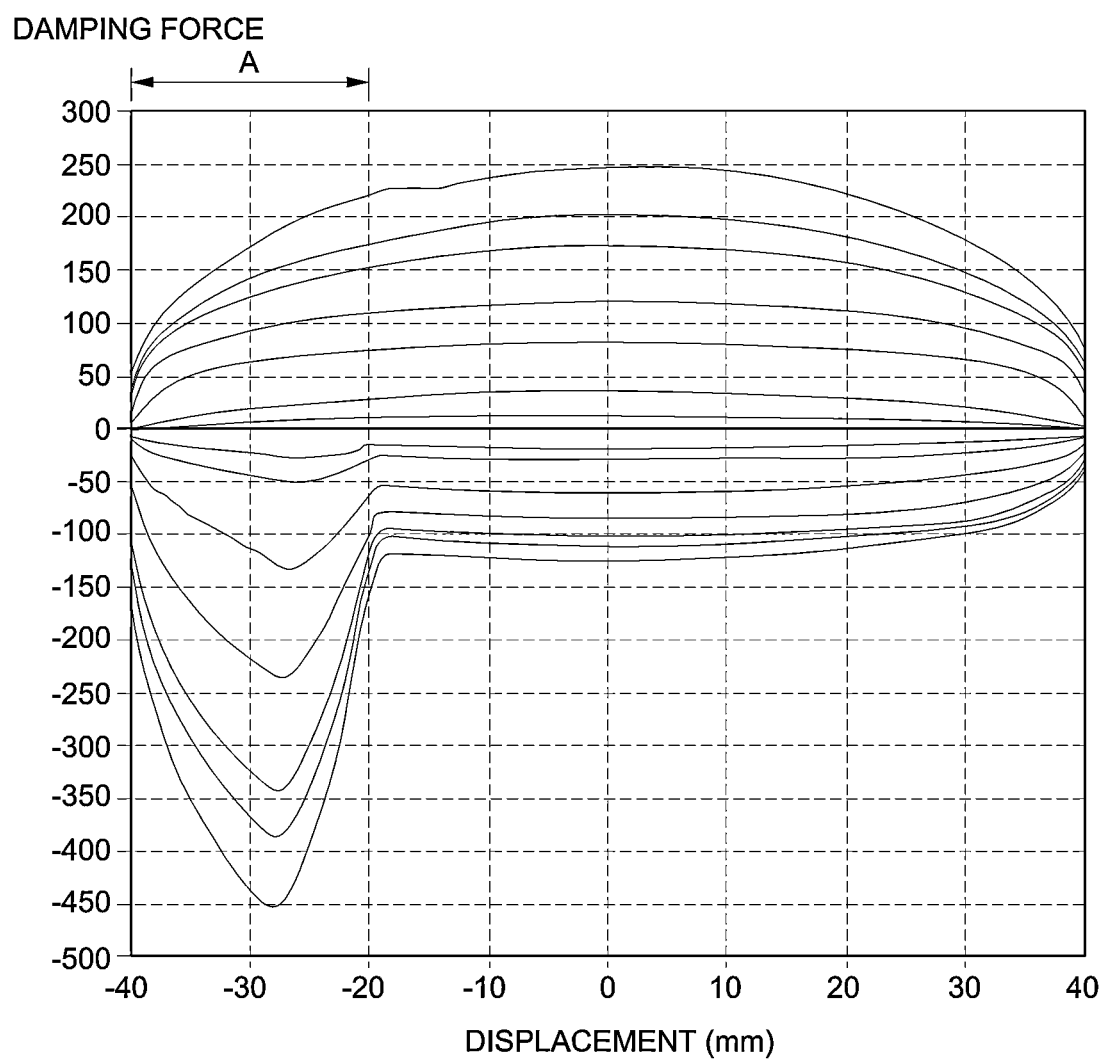
FIG. 6 is a graph illustrating a damping force of the shock absorber illustrated in FIG. 4.
Figure 7:
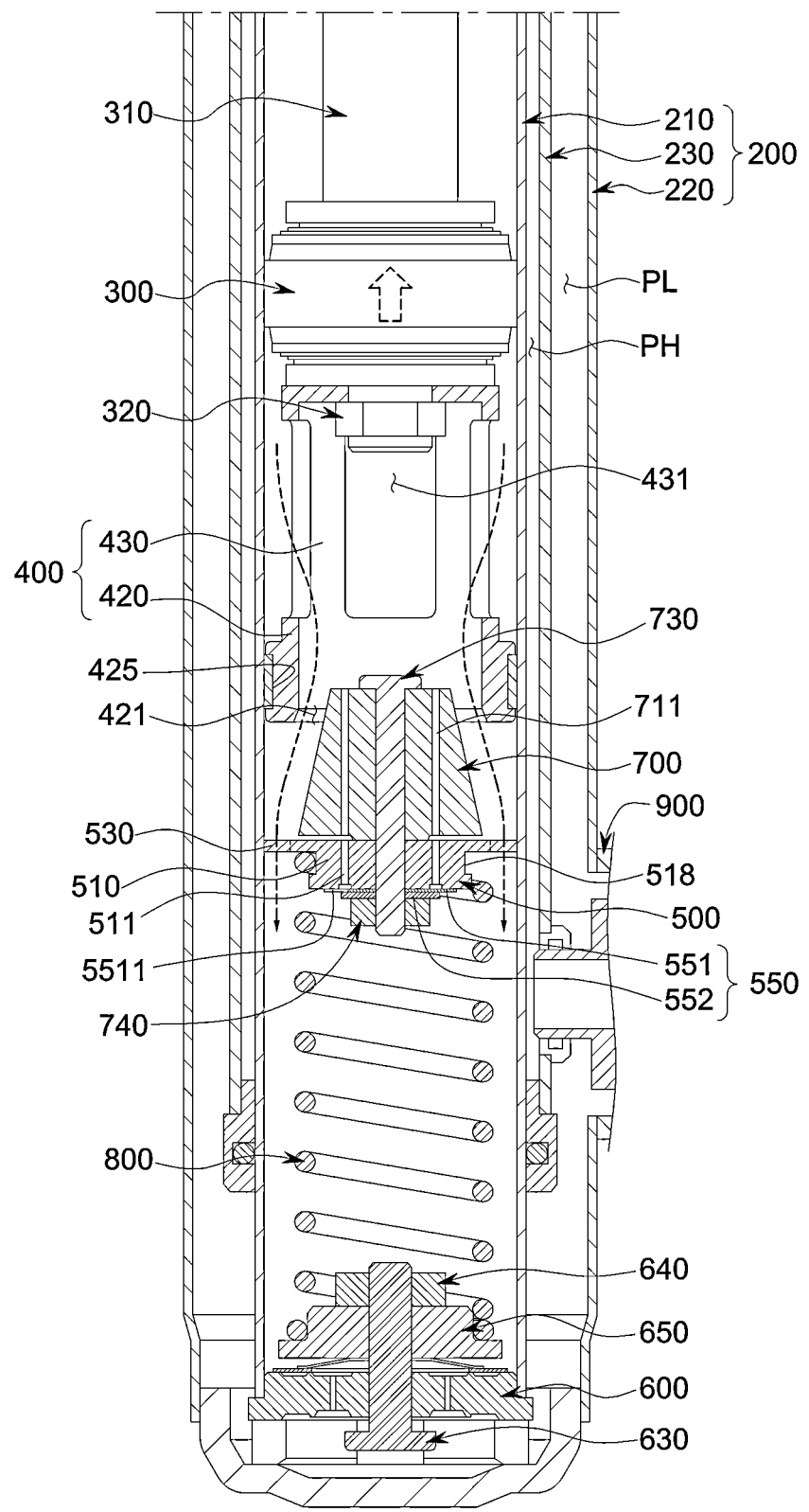
FIG. 7 is a cross-sectional view illustrating an extension process of the shock absorber illustrated in FIG. 1.

Hereinafter, an operational principle of the shock absorber 101 according to the embodiment of the present disclosure will be described in detail with reference to FIGS. 3 to 6. FIG. 3 illustrates an initial state of the compression process of the shock absorber 101, and FIG. 4 illustrates a late state of the compression process of the shock absorber 101. FIG. 5 is an enlarged cross-sectional view illustrating the damping force adjustment member 550. FIG. 6 is a graph illustrating a damping force of the shock absorber 101 according to the embodiment of the present disclosure. Further, FIG. 7 illustrates the extension process of the shock absorber 101.

First, as illustrated in FIG. 3, when the piston valve 300 begins to move downward during the compression process, the fluid in the compression chamber flows to the rebound chamber through the piston valve 300 or flows to the reserve chamber through the body valve 600.

In this case, the fluid, which is in the region of the compression chamber in which the elastic member 820 is disposed, flows into the hollow cylindrical portion 430 of the hollow cylindrical expansion member 400 through the upper guide flow paths 531 and upper guide holes 511 of the upper guide member 500 and then flows in the direction toward the piston valve 300 through the expansion through-holes 431 of the hollow cylindrical expansion member 400. Further, the fluid passes through the piston valve 300 and flows to the rebound chamber.

As the piston valve 300 continuously moves downward and the impact mitigation member 700 is inserted deep into the hollow cylindrical portion 430 of the hollow cylindrical expansion member 400, the area of the flow path connecting the expansion guide hole 421 and the expansion through-holes 431 of the hollow cylindrical expansion member 400 gradually is decreased by the impact mitigation member 700 having the truncated conical shape.

When the area of the flow path connecting the expansion guide hole 421 and the expansion through-holes 431 of the hollow cylindrical expansion member 400 gradually decreases as described above, the hydraulic pressure applied to the compression chamber gently increases. It is possible to inhibit the occurrence of impact caused by the rapid increase in hydraulic pressure. The impact caused by the rapid increase in hydraulic pressure may cause impact feeling and impact sound.

Next, as illustrated in FIG. 4, when the piston valve 300 continuously moves downward and the hollow cylindrical expansion member 400 adjoins the upper guide member 500 and closes the plurality of upper guide flow paths 531 during the compression process, the fluid, which is in the region of the compression chamber in which the elastic member 800 is disposed, may flow only through the upper guide holes 511 of the upper guide member 500, as illustrated in FIG. 5. Further, the fluid flowing through the upper guide holes 511 of the upper guide member 500 flows into the hollow cylindrical portion 430 of the hollow cylindrical expansion member 400 and then flows in the direction toward the piston valve 300 through the expansion through-holes 431 of the hollow cylindrical expansion member 400. Further, the fluid passes through the piston valve 300 and flows to the rebound chamber.

Meanwhile, the damping force adjustment member 550 may be disposed on the other surface of the upper guide member 500 facing the body valve 600 and restrict a part of a flow of the fluid flowing to the plurality of upper guide holes 511.

For example, the damping force adjustment member 550 may block some of the plurality of upper guide holes 511 of the upper guide member 500. That is, the damping force adjustment member 550 may adjust an area of the plurality of upper guide holes 511 through which the fluid passes.

It is possible to determine and adjust the degree to which the damping force adjustment member 550 restricts the upper guide holes 511 in consideration of the operational condition required for the shock absorber 101, the damping force required to be provided by the shock absorber 101, the response sensitivity, and the like at the time of designing the shock absorber 101.

As described above, after the hollow cylindrical expansion member 400 adjoins the upper guide member 500 and blocks the plurality of upper guide flow paths 531 during the compression process, the area of the flow path of the upper guide member 500 through which the fluid passes greatly decreases, such that the hydraulic pressure applied to the compression chamber increases, and the damping force in the corresponding stroke greatly increases during the compression process.

FIG. 6 is a graph illustrating a damping force with respect to the displacement of the piston valve 300 of the shock absorber 101 according to the embodiment of the present disclosure. Specifically, section A illustrated in FIG. 6 corresponds to an operating state in which the hollow cylindrical expansion member 400 adjoins the upper guide member 500 and closes the plurality of upper guide flow paths 531, such that the fluid flows only through the upper guide holes 511, as illustrated in FIG. 4.

As illustrated in FIG. 6, it can be ascertained that the damping force greatly increases in section A indicating the state in which the hollow cylindrical expansion member 400 adjoins the upper guide member 500 and closes the plurality of upper guide flow paths 531 of the upper guide member 500.

Next, as illustrated in FIG. 6, when the piston valve 300 moves upward and separates from the section in which the elastic member 800 acts during the extension process, the hollow cylindrical expansion member 400 separates from the upper guide member 500, and the plurality of upper guide flow paths 531 is also opened.

When the plurality of upper guide flow paths 531 is opened during the extension process as described above, the fluid may be naturally introduced, which makes it possible to inhibit the occurrence of negative pressure.

With this configuration, the shock absorber 101 according to the first embodiment of the present disclosure may increase the damping force and improve durability while having the simple configuration.

Specifically, the shock absorber 101 may implement the increased damping force while having the simple configuration including the piston valve 300, the body valve 600, the hollow cylindrical expansion member 400, the upper guide member 500, and the elastic member 800. Further, the entire configuration of the shock absorber 101 is simplified, which makes it possible to improve durability and ensure high productivity. In particular, it is possible to reduce an overall length of the shock absorber 101.

At the time of designing the shock absorber 101, the elastic modulus of the elastic member 810 may be selectively determined, and the degree to which the damping force adjustment member restricts the upper guide holes may be adjusted, thereby adjusting the damping force of the shock absorber 101.

Therefore, in a case in which the shock absorber 101 according to the embodiment of the present disclosure is applied to the vehicle, the shock absorber 101 may effectively stabilize the posture of the vehicle by generating a hydraulic pressure at a particular vehicle height. In particular, when the vehicle rattles or travels on a concave ground surface, the shock absorber may control the posture of the vehicle. Further, the shock absorber may stably maintain the posture of the vehicle when the vehicle is rapidly steered.

While the embodiments of the present disclosure have been described with reference to the accompanying drawings, those skilled in the art will understand that the present disclosure may be carried out in any other specific form without changing the technical spirit or an essential feature thereof.

Accordingly, it should be understood that the aforementioned embodiments are described for illustration in all aspects and are not limited, and the scope of the present disclosure shall be represented by the claims to be described below, and it should be construed that all of the changes or modified forms induced from the meaning and the scope of the claims, and an equivalent concept thereto are included in the scope of the present disclosure.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A shock absorber comprising:
  a tube having an interior filled with a fluid;
  a piston valve configured to be movable upward or downward in the tube and having a flow path through which the fluid flows;
  a body valve installed at a lower side of the tube and having a flow path through which the fluid flows;
  a piston rod configured to support the piston valve and having one end protruding while penetrating the piston valve;
  an upper guide member interposed between the piston valve and the body valve and having a plurality of upper guide flow paths formed outside a periphery of the upper guide member, and a plurality of upper guide holes formed inside the periphery of the upper guide member;
  a hollow cylindrical expansion member coupled to one end of the piston rod and having expansion through-holes through which the fluid having passed through the plurality of upper guide flow paths and the plurality of upper guide holes passes, the hollow cylindrical expansion member being configured to block the upper guide flow paths when the hollow cylindrical expansion member adjoins the upper guide member; and
  an elastic member interposed between the upper guide member and the body valve.

2. The shock absorber of claim 1, wherein the upper guide member comprises:
  an upper guide body having the plurality of upper guide holes and having a circular plate shape that adjoins one end of the elastic member; and
  a plurality of upper guide protrusions protruding from a periphery of the upper guide body and configured to adjoin an inner peripheral surface of the tube, the plurality of upper guide protrusions being spaced apart from one another in a circumferential direction, and wherein the upper guide flow paths are formed between the plurality of upper guide protrusions.

3. The shock absorber of claim 1, wherein the hollow cylindrical expansion member comprises:
  an annular portion configured to be movable along an inner peripheral surface of the tube and having an expansion guide hole through which the fluid having passed through the plurality of upper guide flow paths and the plurality of upper guide holes flows, the annular portion being configured to block the plurality of upper guide flow paths when the annular portion adjoins the upper guide member; and
  a hollow cylindrical portion extending in a direction from the annular portion toward the piston valve and coupled to one end of the piston rod, the hollow cylindrical portion being spaced apart from the inner peripheral surface of the tube and having the expansion through-holes formed in a lateral surface of the hollow cylindrical portion that faces the inner peripheral surface of the tube.

4. The shock absorber of claim 3, further comprising:
a piston ring provided on an outer peripheral surface of the annular portion of the hollow cylindrical expansion member and configured to adjoin the inner peripheral surface of the tube.

5. The shock absorber of claim 4, wherein a ring accommodation groove is formed in the outer peripheral surface of the annular portion, and the piston ring is inserted into the ring accommodation groove.

6. The shock absorber of claim 3, further comprising:
an impact mitigation member provided on one surface of the upper guide member and having a truncated conical shape having a diameter that increases toward the upper guide member such that the truncated conical shape is inserted into the hollow cylindrical portion through the expansion guide hole of the annular portion, the impact mitigation member having therein a plurality of connection flow paths that connects the plurality of upper guide holes and the expansion through-holes.

7. The shock absorber of claim 6, wherein when the piston valve moves downward during a compression process, the impact mitigation member is inserted into the hollow cylindrical portion of the hollow cylindrical expansion member, and an area of a flow path connecting the expansion guide hole and the expansion through-holes decreases as the hollow cylindrical expansion member and the upper guide member become close to each other.

8. The shock absorber of claim 6, further comprising:
a connection pin configured to couple the impact mitigation member and the upper guide member while penetrating the impact mitigation member and the upper guide member.

9. The shock absorber of claim 1, further comprising:
a damping force adjustment member provided on the other surface of the upper guide member facing the body valve, the damping force adjustment member being configured to restrict a part of a flow of the fluid flowing to the plurality of upper guide holes.

10. The shock absorber of claim 9, wherein the damping force adjustment member comprises:
a first disc having a plurality of cut-out portions formed along a periphery of the first disc and configured to communicate with some or all of the plurality of upper guide holes; and
a second disc configured to adjoin a surface of the first disc facing the body valve and cover some or all of the plurality of cut-out portions.

11. The shock absorber of claim 1, further comprising:
a lower guide member interposed between the elastic member and the body valve and configured to support the other end of the elastic member.

12. The shock absorber of claim 1, wherein when the piston valve begin to move downward during a compression process, a part of the fluid in a region in which the elastic member is disposed passes through the plurality of upper guide flow paths and the plurality of upper guide holes of the upper guide member and then flows toward the piston valve through the expansion through-holes of the hollow cylindrical expansion member, and
wherein when the piston valve moves downward, the hollow cylindrical expansion member adjoins the upper guide member and blocks the plurality of upper guide flow paths, and the fluid flows to the expansion through-holes through the plurality of upper guide holes.

13. A shock absorber comprising:
a first tube having an interior filled with a fluid;
a piston valve configured to be movable upward or downward in the first tube and configured to divide the interior of the first tube into a compression chamber disposed at a lower side thereof and a rebound chamber disposed at an upper side thereof, the piston valve being configured to adjust a flow of the fluid between the compression chamber and the rebound chamber;
a second tube configured to surround the first tube and define a reserve chamber between the first tube and the second tube;
a body valve installed at a lower side of the first tube and configured to adjust a flow of the fluid between the compression chamber and the reserve chamber;
a separator tube installed between the first tube and the second tube and configured to divide the reserve chamber into a high-pressure chamber and a low-pressure chamber;
a damping force variable valve coupled to an outer side of the second tube and configured to communicate with the high-pressure chamber and the low-pressure chamber;
a piston rod configured to support the piston valve and having one end protruding toward the compression chamber while penetrating the piston valve;
an upper guide member interposed between the piston valve and the body valve and having a plurality of upper guide flow paths formed outside a periphery of the upper guide member, and a plurality of upper guide holes formed inside the periphery of the upper guide member;
a hollow cylindrical expansion member coupled to one end of the piston rod and having expansion through-holes through which the fluid having passed through the plurality of upper guide flow paths and the plurality of upper guide holes passes, the hollow cylindrical expansion member being configured to block the upper guide flow paths when the hollow cylindrical expansion member adjoins the upper guide member; and
an elastic member interposed between the upper guide member and the body valve.

14. The shock absorber of claim 13, wherein the upper guide member comprises:
an upper guide body having the plurality of upper guide holes and having a circular plate shape that adjoins one end of the elastic member; and
a plurality of upper guide protrusions protruding from a periphery of the upper guide body and configured to adjoin an inner peripheral surface of the tube, the plurality of upper guide protrusions being spaced apart from one another in a circumferential direction, and
wherein the upper guide flow paths are formed between the plurality of upper guide protrusions.

15. The shock absorber of claim 13, wherein the hollow cylindrical expansion member comprises:
an annular portion configured to be movable along an inner peripheral surface of the tube and having an expansion guide hole through which the fluid having passed through the plurality of upper guide flow paths and the plurality of upper guide holes flows, the annular portion being configured to block the plurality of upper guide flow paths when the annular portion adjoins the upper guide member; and a hollow cylindrical portion extending in a direction from the annular portion toward the piston valve and coupled to one end of the piston rod, the hollow cylindrical portion being spaced apart from the inner peripheral surface of the tube and having the expansion through-holes formed in a lateral surface of the hollow cylindrical portion that faces the inner peripheral surface of the tube.

16. The shock absorber of claim 15, further comprising:

a piston ring provided on an outer peripheral surface of the annular portion of the hollow cylindrical expansion member and configured to adjoin the inner peripheral surface of the tube.

17. The shock absorber of claim 16, wherein a ring accommodation groove is formed in the outer peripheral surface of the annular portion, and the piston ring is inserted into the ring accommodation groove.

18. The shock absorber of claim 15, further comprising:

an impact mitigation member provided on one surface of the upper guide member and having a truncated conical shape having a diameter that increases toward the upper guide member such that the truncated conical shape is inserted into the hollow cylindrical portion through the expansion guide hole of the annular portion, the impact mitigation member having therein a plurality of connection flow paths that connects the plurality of upper guide holes and the expansion through-holes.

19. The shock absorber of claim 18, wherein when the piston valve moves downward during a compression process, the impact mitigation member is inserted into the hollow cylindrical portion of the hollow cylindrical expansion member, and an area of a flow path connecting the expansion guide hole and the expansion through-holes decreases as the hollow cylindrical expansion member and the upper guide member become close to each other.

20. The shock absorber of claim 18, further comprising:

a connection pin configured to couple the impact mitigation member and the upper guide member while penetrating the impact mitigation member and the upper guide member.

21. The shock absorber of claim 13, further comprising:

a damping force adjustment member provided on the other surface of the upper guide member facing the body valve, the damping force adjustment member being configured to restrict a part of a flow of the fluid flowing to the plurality of upper guide holes.

22. The shock absorber of claim 21, wherein the damping force adjustment member comprises:

a first disc having a plurality of cut-out portions formed along a periphery of the first disc and configured to communicate with some or all of the plurality of upper guide holes; and a second disc configured to adjoin a surface of the first disc facing the body valve and cover some or all of the plurality of cut-out portions.

23. The shock absorber of claim 13, further comprising:

a lower guide member interposed between the elastic member and the body valve and configured to support the other end of the elastic member.

24. The shock absorber of claim 13, wherein when the piston valve begins to move downward during a compression process, a part of the fluid in a region of the compression chamber in which the elastic member is disposed passes through the plurality of upper guide flow paths and the plurality of upper guide holes of the upper guide member and then flows to the rebound chamber through the expansion through-holes of the hollow cylindrical expansion member via the piston valve, and wherein when the piston valve moves downward, the hollow cylindrical expansion member adjoins the upper guide member and blocks the plurality of upper guide flow paths, and the fluid flows to the rebound chamber through the plurality of upper guide holes.

* * * * *